(12) United States Patent
Chan

(10) Patent No.: US 11,078,953 B2
(45) Date of Patent: Aug. 3, 2021

(54) SWIVEL CONNECTOR

(71) Applicant: Duraflex Hong Kong Limited, Hong Kong (CN)

(72) Inventor: Yick Fai Chan, Hong Kong (CN)

(73) Assignee: Duraflex Hong Kong Limited, Hong Kong (CN)

( * ) Notice: Subject to any disclaimer, the term of this patent is extended or adjusted under 35 U.S.C. 154(b) by 455 days.

(21) Appl. No.: 16/257,211

(22) Filed: Jan. 25, 2019

(65) Prior Publication Data

US 2020/0141442 A1   May 7, 2020

Related U.S. Application Data

(63) Continuation-in-part of application No. 16/181,704, filed on Nov. 6, 2018.

(51) Int. Cl.
  *F16C 11/10* (2006.01)
  *F16G 11/10* (2006.01)

(52) U.S. Cl.
  CPC .............. *F16C 11/10* (2013.01); *F16G 11/10* (2013.01)

(58) Field of Classification Search
  CPC ........... A44B 11/25; F16C 11/10; F16G 11/10
  See application file for complete search history.

(56) References Cited

U.S. PATENT DOCUMENTS

| 3,504,937 | A |   | 4/1970  | Panovic |                     |
|-----------|---|---|---------|---------|---------------------|
| 3,545,051 | A | * | 12/1970 | Kennard | F16B 45/00 294/82.22 |
| 4,577,374 | A | * | 3/1986  | Lii     | A44B 11/28 24/165   |
| 4,645,373 | A | * | 2/1987  | Purdy   | F16B 7/042 403/341  |

(Continued)

FOREIGN PATENT DOCUMENTS

| CN | 1096435 A   | 12/1994 |
| CN | 203146555 U | 8/2013  |

(Continued)

OTHER PUBLICATIONS

English Translation of the International Search Report and the Written Opinion of the International Searching authority, or the Declaration, dated Nov. 28, 2019 in Chinese Application No. PCT/CN2019/107797.

(Continued)

*Primary Examiner* — David M Upchurch
(74) *Attorney, Agent, or Firm* — Collard & Roe, P.C.

(57) ABSTRACT

A swivel connector has a female part and a male part that are connected to each other so as to swivel. The female part has a main body with an interior cavity and an open face, and a strap connector. The male part has a plug portion and a strap connector. A ring lock locks the male portion to the female portion and is formed by two side walls connected by two pivot bars, the side walls of the ring lock being rotatably connected to the female part. The male part is locked to the (Continued)

female part by inserting the plug portion into the interior cavity, and the ring lock is held by spring in a locked position where the open face is blocked by one of the pivot bars. The male part is released from the female part by rotating the ring lock against the force of the spring until the open face is not blocked by the pivot bar.

7 Claims, 7 Drawing Sheets

(56) References Cited

U.S. PATENT DOCUMENTS

| | | | |
|---|---|---|---|
| 5,438,736 A | 8/1995 | Terada et al. | |
| 5,499,432 A * | 3/1996 | Terada | F16B 45/00 24/599.2 |
| 6,308,383 B1 * | 10/2001 | Schrader | B60P 7/0807 24/136 R |
| 6,401,312 B1 * | 6/2002 | Wang | F16B 45/02 24/265 H |
| 8,172,476 B2 * | 5/2012 | Berney | F16B 45/00 403/164 |
| 2006/0179784 A1 * | 8/2006 | Chen | F16B 21/00 52/698 |
| 2017/0049193 A1 | 2/2017 | Kolasa et al. | |
| 2018/0029847 A1 * | 2/2018 | Cowell | B66C 1/66 |

FOREIGN PATENT DOCUMENTS

| | | |
|---|---|---|
| CN | 106455761 A | 2/2017 |
| CN | 206449160 U | 8/2017 |
| FR | 2606751 A1 | 5/1988 |

OTHER PUBLICATIONS

International Preliminary Report on Patentability dated May 20, 2021, issued in Chinese Application No. PCT/CN2019/107797 (in English).

* cited by examiner

SWIVEL CONNECTOR

CROSS-REFERENCE TO RELATED APPLICATIONS

This application is a continuation-in-part of U.S. patent application Ser. No. 16/181,704, filed on Nov. 6, 2018, the disclosure of which is herein incorporated by reference.

BACKGROUND OF THE INVENTION

1. Field of the Invention

This invention relates to a swivel connector for connecting two straps together. In particular, the invention relates to a swivel connector that is locked and unlocked by rotating a ring lock that locks the two parts together.

2. The Prior Art

Swivel connectors are commonly used to connect two straps to each other, for example when attaching an article to a bag. The connector consists of a two parts that are locked together by inserting the male part into the female part and then locking them together, while still allowing rotation of the parts relative to each other. United States Patent Application Publication No. 2017/0049193 discloses a swivel connector of this type, having a male part and a female part that are connected together in a rotatable fashion. A spring-loaded push button is used for releasing the two parts from the locked position. The drawback of this device is that the swing of the male part is exactly in the same direction that can push the push button to open from the inside. Thus in normal use, there is a risk that the button may be opened accidentally and release the male part from the female part. Moreover, the push button has a long, thin extension that functions as a spring to secure the two parts together in the locked position. However, because this shape is highly flexible, there is always a risk of inadvertent release.

SUMMARY OF THE INVENTION

It is therefore an object of the invention to provide a swivel connector that cannot be inadvertently disconnected, is structurally strong, and has a reduced swing angle.

These and other objects are accomplished by a swivel connector that has a female part and a male part that are connected to each other via a ring lock so as to swivel. The female part comprises a main body having an end wall, two side pieces, an interior cavity and an open face, and a strap connector connected to the main body. The male part comprises a plug portion and a strap connector connected to the plug portion. The ring lock has two side walls connected by two pivot bars located on opposite sides from each other, the side walls of the ring lock being rotatably connected to the side pieces of the main body of the female part so that the ring lock can be rotated around the female part into a locked position and an unlocked position by raising and lowering the pivot bars. The male part is locked to the female part by inserting the plug portion into the interior cavity, and then rotating the ring lock into a locked position where the open face is blocked by one of the pivot bars. The male part is released from the female part by rotating the ring lock until the open face is not blocked by the pivot bar, and sliding the male part out of the interior cavity via the open face.

In a preferred embodiment, the interior cavity has a shape corresponding to a shape of the plug portion. In particular, the interior cavity can have an upper chamber, a lower chamber and a flange between the upper and lower chambers on at least one of the side wall or end pieces. The plug portion has an end cap corresponding to the shape of the upper chamber, and a flange extending outward from the plug below the end cap and corresponding to a shape of the lower chamber, with a groove formed between the flange of the plug portion and the end cap. When the male part is inserted into the interior cavity, the flange in the interior cavity engages the groove in the plug portion to secure the male part to the female part. In this arrangement, the male part can swivel around a vertical axis of rotation with respect to the female part, but due to the engagement of the groove and the flange, no vertical movement can take place, so that the plug portion is firmly seated in the interior cavity.

In one embodiment, the plug portion and interior cavity have a round cross-section, and when the male part is locked to the female part, the male part and female parts can rotate with respect to each other about a rotation axis extending through a center of the plug portion and interior cavity.

In another embodiment, the pivot bar facing the open face has a protrusion extending into the interior cavity, the protrusion abutting the plug portion when the ring lock is in the locked position. This keeps the male part from moving laterally within the interior cavity, as the protrusion fills any space between the pivot bar and the male portion.

In another embodiment, the female part has a stop located on an exterior of the side wall, the stop abutting the ring lock when the ring lock is in a locked position and preventing rotation of the ring lock beyond the fully locked position.

To assist the user in locking and unlocking the ring lock the ring lock can have positioning flanges on each of the pivot bars. These positioning flanges extend outward from each pivot bar and provide a larger surface area to assist a finger in rotating the pivot bars.

Preferably, the ring lock is held in either the locked or unlocked position by a snap locked configuration, so that inadvertent rotation between the locked and unlocked position is prevented unless a predetermined force is applied to the ring lock.

In a one embodiment, the ring lock has a detent located on an interior face of each side wall adjacent each pivot bar, and the side pieces of the female part have indentations corresponding to the locked position and the unlocked position of the ring lock, such that the ring lock is held in the unlocked or locked position by the detents resting in the respective indentations unless a force that moves the detent out of the indentation is applied to actively change the position of the ring lock.

In an alternative embodiment, the swivel connector has a spring element formed on one side of the female part, which forces the ring lock into a locked position. The ring lock can be moved into an unlocked position to release the male part by swiveling the ring lock with sufficient force to overcome the pressure of the spring. When the ring lock is released, it moves automatically back into the locked position. This way, the ring lock cannot be inadvertently moved into an unlocked position to release the swivel connector. The ring lock must be held under pressure in the unlocked position in order to release the male part from the female part.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE EMBODIMENTS

Figure 1:
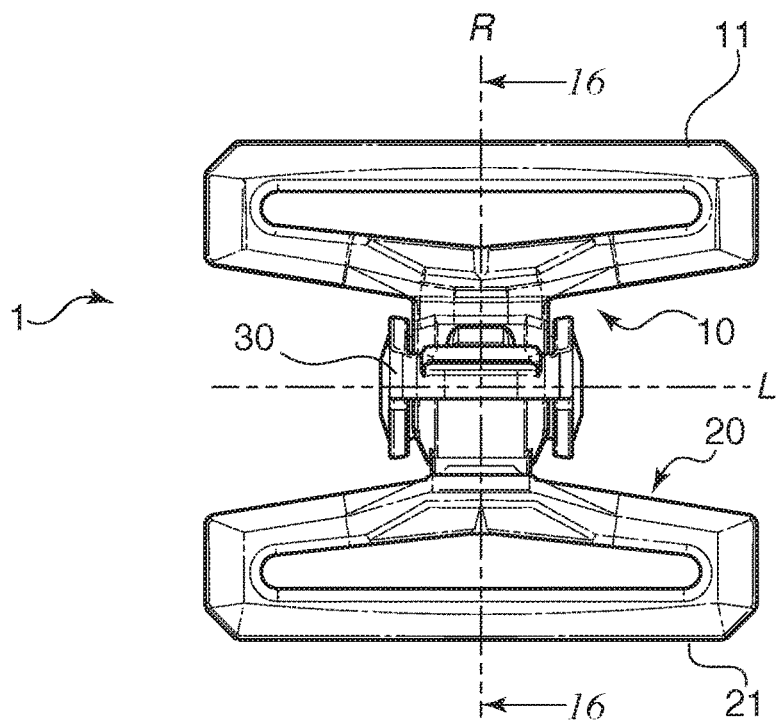
FIG. 1 shows a front view of the assembled swivel connector according to the invention.
Figure 2:
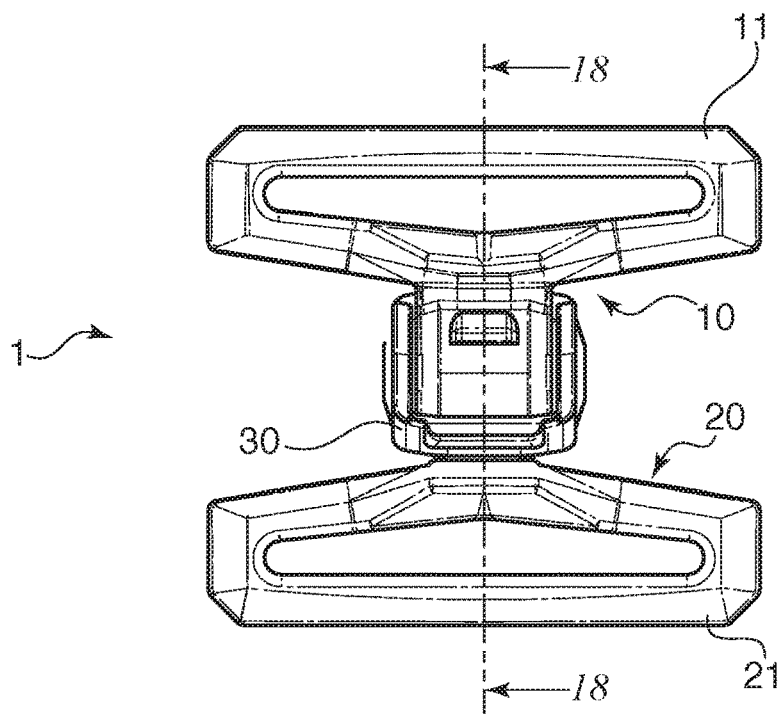
FIG. 2 shows a rear view of the swivel connector.
Figure 3:
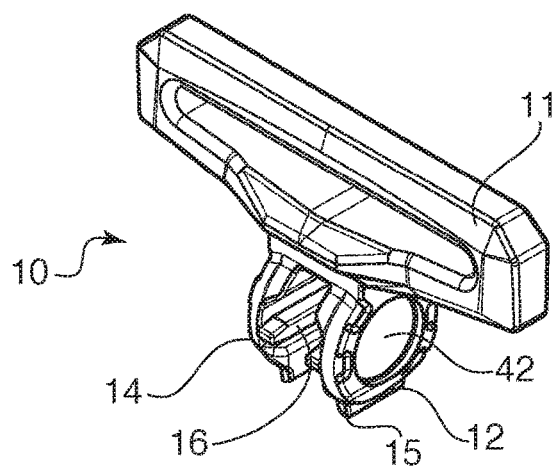
FIG. 3 shows a perspective view of the female part of the swivel connector.
Figure 4:
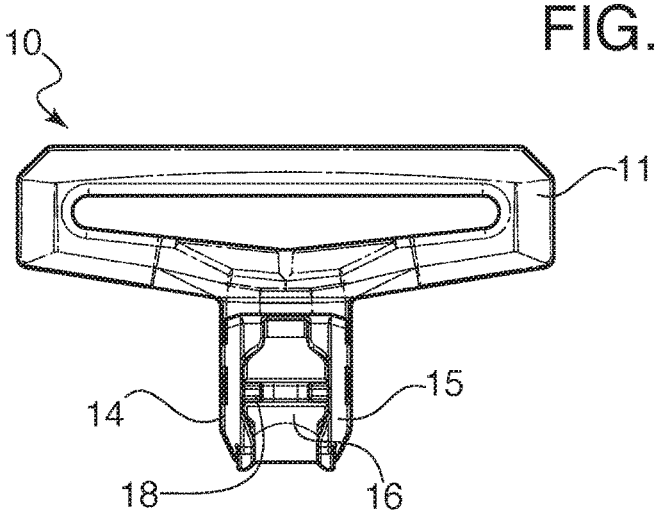
FIG. 4 shows a front view of the female part.

Referring now in detail to the drawings, FIGS. 1 and 2 show the complete assembled swivel connector 1 according to the invention. Swivel connector 1 is formed from a female part 10, a male part 20, and a ring lock 30. Ring lock 30 is snapped onto female part 10 and is rotated into position to lock male part 20 to female part 10 when male part 20 is inserted into female part 10. Strap connectors 11, 21 are connected to female part 10 and male part 20, so that two straps can be connected together via swivel connector 1. Female part 10 and male part 20 can rotate relative to each other around axis of rotation R when female part 10 is locked to male part 20.

Female part 10 is shown by itself in FIGS. 3-7. Female part 10 has a main body 12 having an end wall 13, two side pieces 14, 15, an interior cavity 16 and an open face disposed opposite end wall 13 and between side pieces 14, 15. A circumferential flange 18 is disposed in the center of interior cavity 16. A stop 17 is located on end wall 13, opposite the opening to cavity 16.

Figure 8:
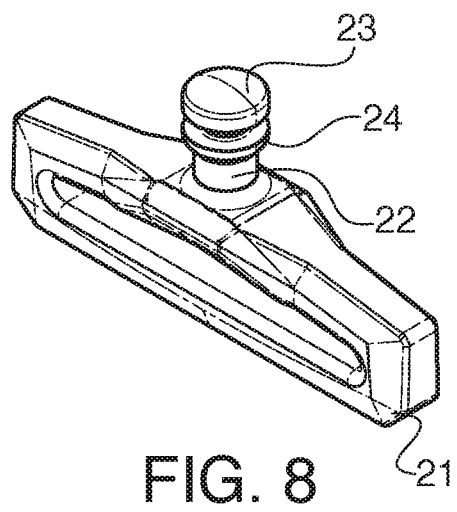
FIG. 8 shows a perspective view of the male part of the swivel connector according to the invention.
Figure 9:
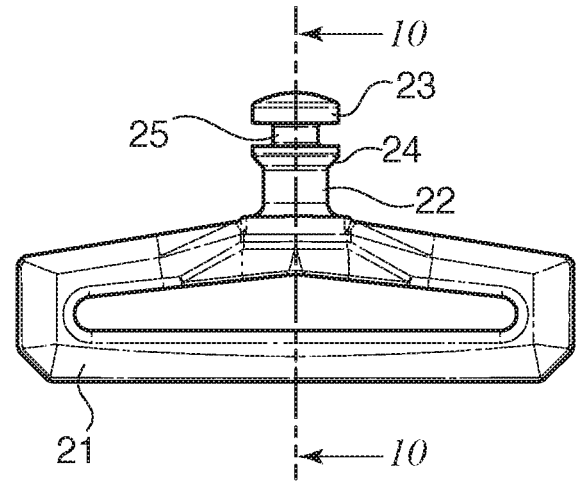
FIG. 9 shows a front view of the male part.
Figure 10:
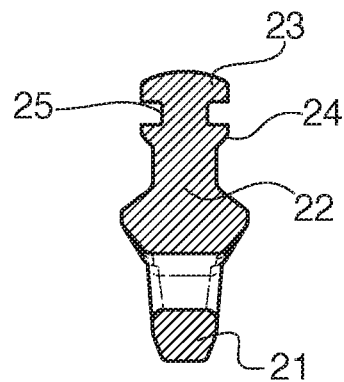
FIG. 10 shows a cross-sectional view along lines 10-10 of FIG. 9.
Figure 11:
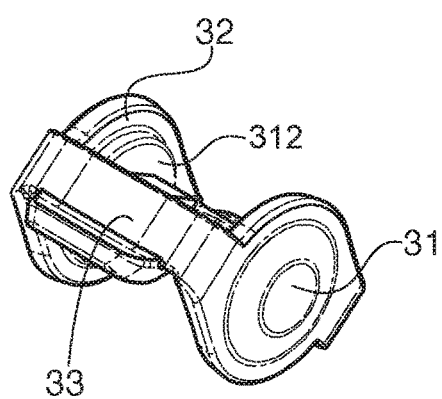
FIG. 11 shows a perspective view of the ring lock of the swivel connector according to the invention.
Figure 12:
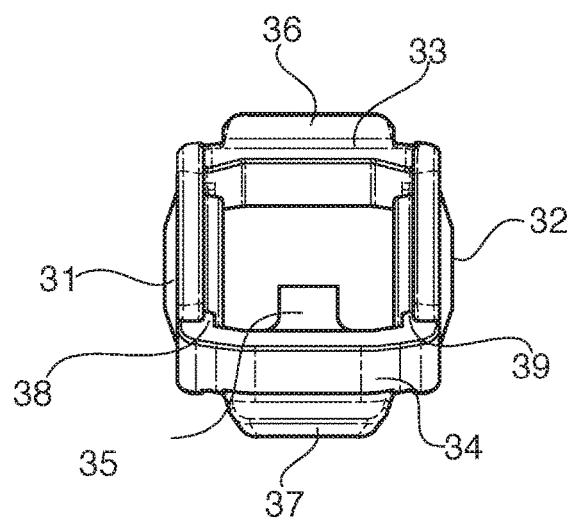
FIG. 12 shows a front view of the ring lock.
Figure 13:
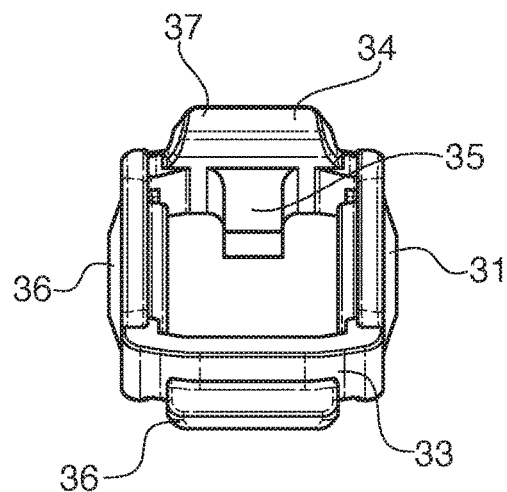
FIG. 13 shows a rear view of the ring lock.
Figure 14:
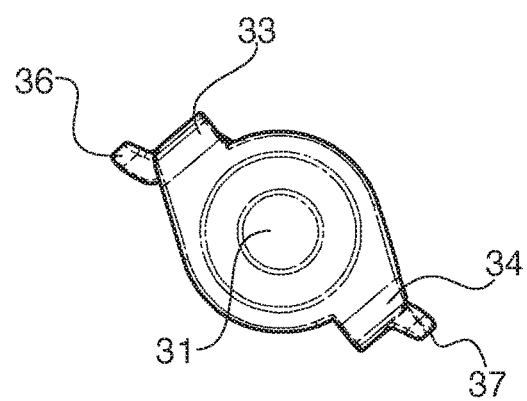
FIG. 14 shows a side view of the ring lock.
Figure 15:
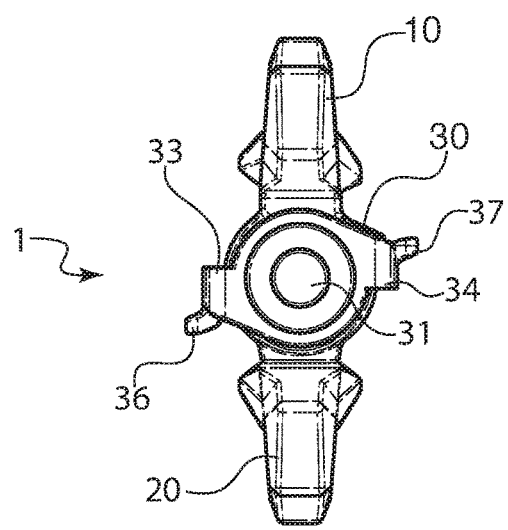
FIG. 15 shows a side view of the assembled swivel connector in a locked position.

Male part 20 is shown by itself in FIGS. 8-10. Male part 20 has a plug portion 22 with an end cap 23 and a flange 24 located below the end cap 23, with a groove 25 in between.

Ring lock 30 is shown in detail in FIGS. 11-14. Ring lock 30 is formed from two side walls 31, 32 connected by two pivot bars 33, 34 located on opposite sides from each other. Each of pivot bars 33, 34 has a positioning flange 36, 37 extending outward therefrom, to allow a user to rotate ring lock 30 using a finger. A protrusion 35 is located on pivot bar 34, extending inward toward pivot bar 33. Ring lock 30 is snapped onto female part 10 by fitting protrusions 312 on the interior of side walls 31, 32 of ring lock 30 into indentations 42 of side pieces 14, 15 of female part 10. The round shape of protrusion 312 and indentation 42 ensures that ring lock can swivel freely around an axis of rotation L extending through the center ring lock 30 and side pieces 14, 15 of female part 10.

Figure 7:
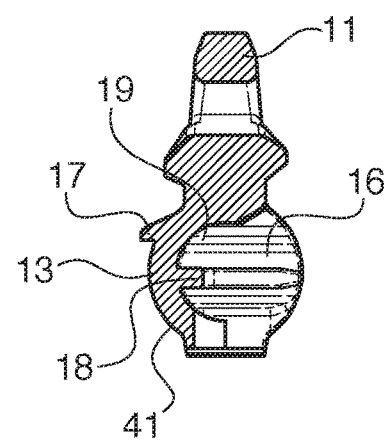
FIG. 7 shows a cross-sectional view along lines 7-7 of FIG. 6.
Figure 16:
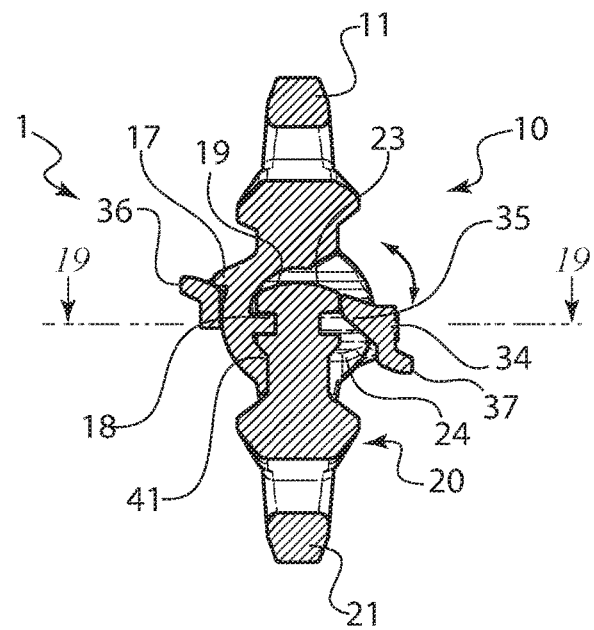
FIG. 16 shows a cross-sectional view along lines 16-16 of FIG. 1 showing the swivel connector in the locked position (rotated 180 degrees from FIG. 15)
Figure 17:
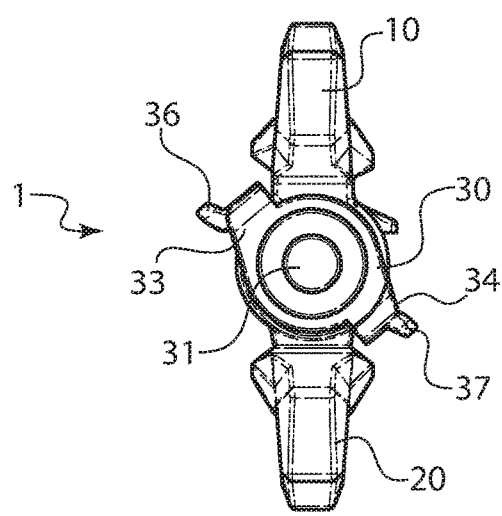
FIG. 17 shows a side view of the swivel connector in an unlocked position.
Figure 18:
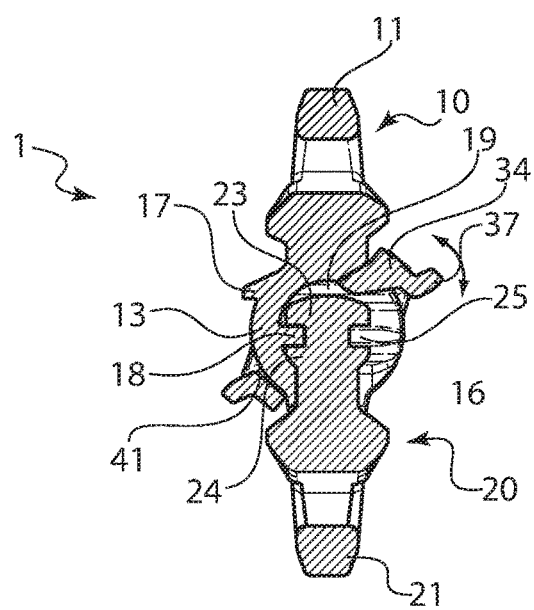
FIG. 18 shows a cross-sectional view along lines 18-18 of FIG. 2 showing the swivel connector in the unlocked position (rotated 180 degrees from FIG. 17)

The fully assembled swivel connector 1 is shown in side and cross-sectional views in FIGS. 15-18. To assemble swivel connector 1, male part 20 is inserted into interior cavity 16 of female part 10, until flange 18 is fully inserted into groove 25 of male part 20, as shown in FIG. 18. Here, ring lock 30 is in an unlocked position, which leaves interior cavity open for insertion of male part 20. As can be seen in FIGS. 7, 16 and 18, interior cavity 16 is divided into an upper chamber 19, which corresponds to the shape of end cap 23, and a lower chamber 41, which corresponds to the shape of flange 24, so that plug 22 fits securely within interior cavity 16 without play.

At this point, assembled ring lock 30 can be pivoted into the locked position shown in FIG. 16 by pressing downward on positioning flange 37 of pivot bar 34. This moves pivot bar 34 into a position where it closes off the opening to interior cavity 16, preventing any exit of male part 20 from female part 10. As shown in FIG. 16, protrusion 35 now presses against end cap 23 of male part 20, to prevent any lateral motion of male part 20 within female part 10. However, due to the round shape of plug 22 and interior cavity 16, male part 20 can swivel or rotate within female part 10, so that straps connected to each of female part 10 and male part 20 can swivel around with respect to each other.

In the locked position, stop 17 on female part 10 prevents pivot arm 33 of ring lock 30 from moving past the position shown in FIG. 16.

Figure 5:
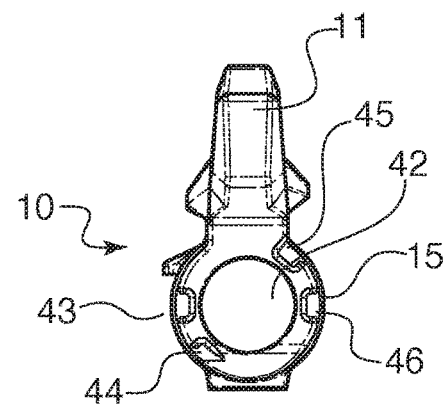
FIG. 5 shows a side view of the female part.
Figure 6:
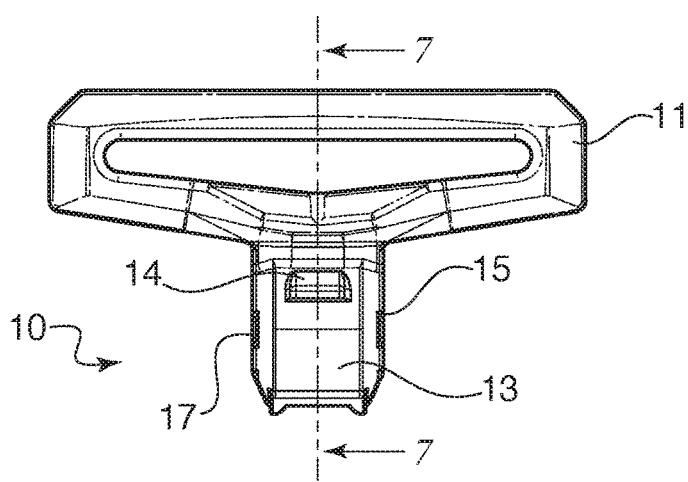
FIG. 6 shows a rear view of the female part.

As shown in FIG. 5, side pieces 14, 15 of female part 10 are equipped with four indentations 43, 44, 45, 46, which interact with detents 38, 39 on ring lock 30, to secure ring lock 30 in the locked and unlocked position. When ring lock 30 is in the locked position by detents 38, 39 being held in indentations 43, 46, ring lock 30 is prevented from moving of these indentations by the frictional resistance of the side pieces 14, 15. The same is true for when ring lock 30 is in the unlocked position by detents 38, 39 being seated in indentations 44, 45.

Figure 19:
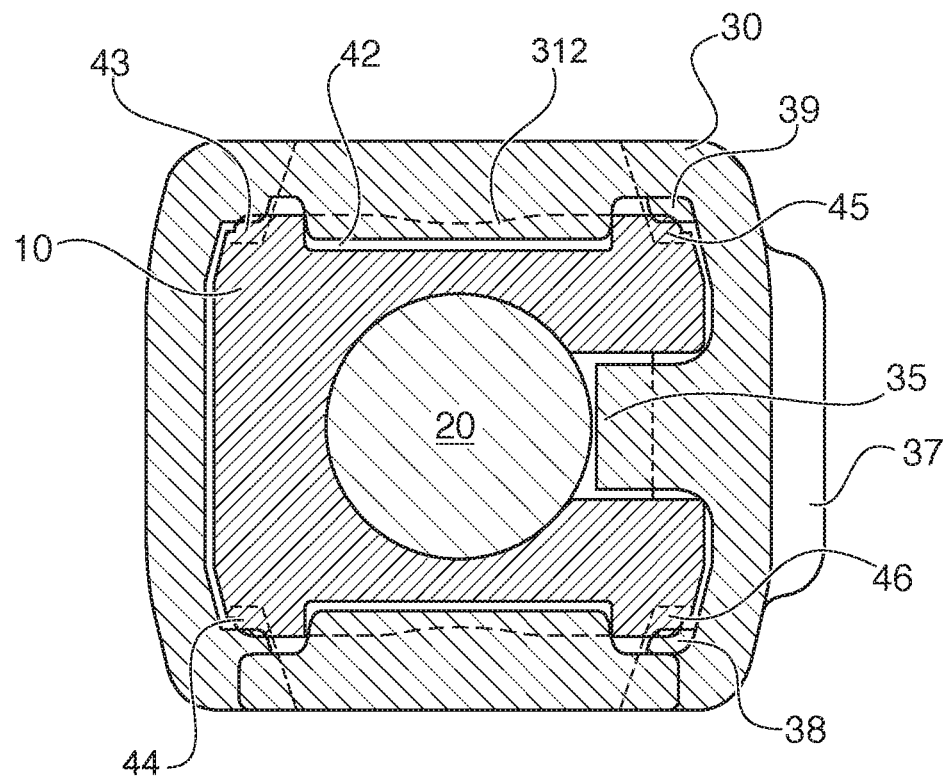
FIG. 19 shows a cross-sectional view along lines 19-19 of FIG. 16.

FIG. 19 shows a cross-section of the assembled swivel connector along lines 19-19 of FIG. 16, showing the detents 38, 39 of the ring lock 30 being seated in the indentations 43, 46. As can be seen, the detents 38, 39 overlap the sides of the female part outside the indentations, so that considerable force is required to rotate ring lock 30 out of the fully locked or fully unlocked position. This prevents inadvertent release of the male part 20 from the female part 10, and allows the male part to be installed easily in the female part without interference from the ring lock during assembly.

Figure 20:
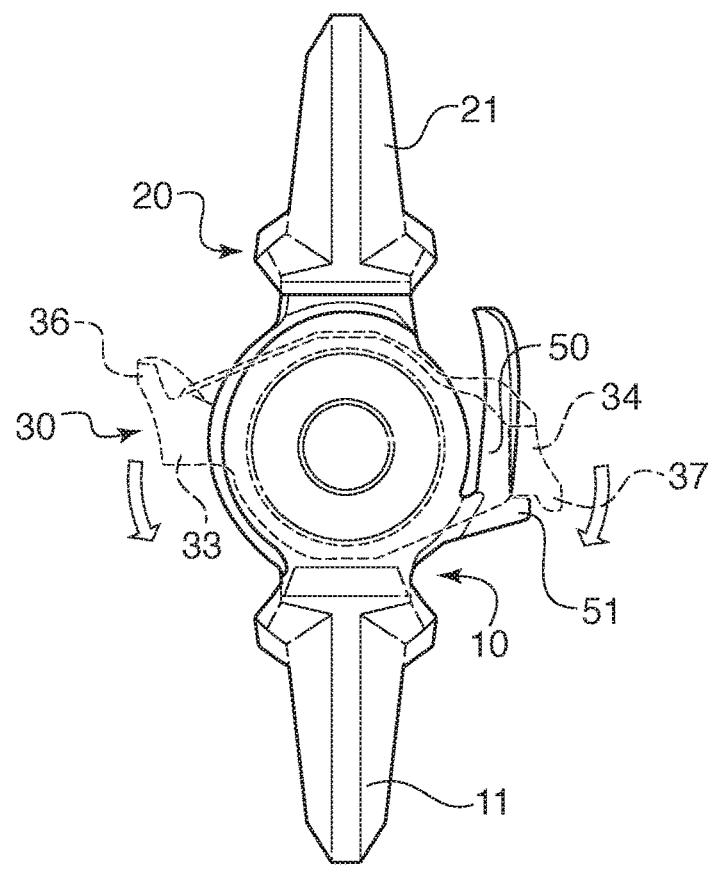
FIG. 20 shows a side view of an alternative embodiment of the invention, with the ring lock shown in broken lines for ease of illustration.
Figure 21:
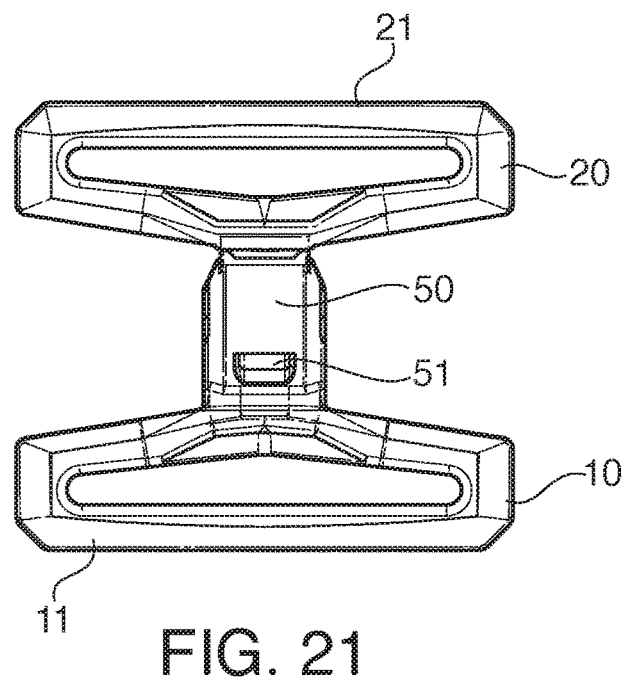
FIG. 21 shows a front view of the embodiment of FIG. 21.

FIGS. 20 and 21 show an alternative embodiment of the invention, in which instead of locking detents to keep the ring lock in the locked and unlocked positions, a spring 50 is integrally formed with female part 10. Spring 50 extends upwardly and exerts an outward force on ring lock 30, to force pivot bar 34 downward and into the locked position, preventing male part 20 from releasing from female part 10. To move ring lock 30 into the unlocked position, the user must press down on flange 36 of pivot bar 33, or press upward on flange 37 of pivot bar 34, to overcome the force of spring 50 until opening for releasing male part 20 is exposed. Once the swivel connector is disconnected, the user can simply release ring lock 30 and it will automatically move back into the locked position. To connect the swivel connector again, the ring lock is pressed into the unlocked position against the force of spring 50 until male part 20 is inserted, at which point ring lock 30 can be released back into the locked position. Spring 50 is preferably constructed of a thickness such that it has sufficient spring force to keep the swivel connector securely locked during use, but flexible enough so that it is not unduly difficult to release with a user's finger.

A stop 51 is positioned at the bottom of spring 50 to prevent ring lock 30 from being rotated past a set position when it is locked.

Accordingly, while only a few embodiments of the present invention have been shown and described, it is obvious that many changes and modifications may be made thereunto without departing from the spirit and scope of the invention.

What is claimed is:

1. A swivel connector comprising:
   a female part comprising:
      a main body having an end wall, two side pieces, an interior cavity and an open face,
      a strap connector connected to the main body, and
      a spring connected to the main body,
   a male part comprising:
      a plug portion, and
      a strap connector connected to the plug portion, and
   a ring lock comprising two side walls connected by two pivot bars located on opposite sides from each other, the side walls of the ring lock being rotatably connected to the side pieces of the main body of the female part and abutting the spring, so that the ring lock can be rotated around the female part from a locked position to an unlocked position by raising and lowering the pivot bars,
   wherein the male part is locked to the female part by inserting the plug portion into the interior cavity,
   wherein the spring exerts a force on the ring lock to maintain the ring lock in a locked position where the open face is blocked by one of the pivot bars to prevent the male part from releasing from the female part, and
   wherein the male part is released from the female part by rotating the ring lock against the force of the spring until the open face is not blocked by the pivot bar, and sliding the male part out of the interior cavity via the open face.

2. The swivel connector according to claim 1, wherein the interior cavity has a shape corresponding to a shape of the plug portion.

3. The swivel connector according to claim 2, wherein the interior cavity has an upper chamber, a lower chamber and a flange between the upper and lower chambers on at least one of the end wall or side pieces, and wherein the plug portion comprises an end cap corresponding to the shape of the upper chamber, and a flange extending outward from the plug below the end cap and corresponding to a shape of the lower chamber, with a groove formed between the flange of the plug portion and the end cap, wherein the flange in the interior cavity engages the groove in the plug portion to secure the male part to the female part.

4. The swivel connector according to claim 1, wherein the plug portion and interior cavity have a round cross-section, and wherein when the male part is locked to the female part, the male part and female parts can rotate with respect to each other about a rotation axis extending through a center of the plug portion and interior cavity.

5. The swivel connector according to claim 1, wherein the pivot bar facing the open face has a protrusion extending into the interior cavity, the protrusion abutting the plug portion when the ring lock is in the locked position.

6. The swivel connector according to claim 1, wherein the female part has a stop located on an exterior of the end wall, the stop abutting the ring lock when the ring lock is in a locked position and preventing rotation of the ring lock beyond the locked position.

7. The swivel connector according to claim 1, wherein the ring lock has positioning flanges on each of the pivot bars, the positioning flanges extending outward from each pivot bar to assist a finger in rotating the pivot bars.

* * * * *